(12) United States Patent
Smith

(10) Patent No.: US 6,570,581 B1
(45) Date of Patent: May 27, 2003

(54) ON-LOCATION VIDEO ASSISTANCE SYSTEM WITH COMPUTER GENERATED IMAGERY OVERLAY

(75) Inventor: Kevin Anthony Smith, Torrance, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/427,197

(22) Filed: Oct. 25, 1999

(51) Int. Cl.[7] .......................... G06T 1/00; G09G 5/377; H04N 5/262
(52) U.S. Cl. ...................................... 345/632
(58) Field of Search .................. 345/158, 435, 345/632, 638; 348/239, 330.01, 330.02, 330.03, 584, 589

(56) References Cited

U.S. PATENT DOCUMENTS 5,602,597 A * 2/1997 Randal Bertram .......... 345/158
5,960,074 A * 9/1999 Clark .......................... 370/310
6,166,744 A * 12/2000 Jaszlics et al. .............. 345/435

* cited by examiner

*Primary Examiner*—Jeffrey Brier
(74) *Attorney, Agent, or Firm*—Woodcock Washburn LLP

(57) ABSTRACT

A video playback system for assisting on-location film production. One embodiment of the invention includes a computer system capable of generating computer generated imagery (CGI) and receiving live video feed from a camera. The computer system is also coupled to a first display screen for displaying computer generated images and a second display screen for displaying the live video feed overlaid with computer generated images. In one embodiment of the present invention, a portion of the first display screen containing computer generated images can be selected for overlaying on the live video feed. The video playback system of the present invention is also capable of storing the live video feed and the images resulted from overlaying the computer generated images and the live video feed. The present invention provides the advantages of allowing live/CGI composites to be played and viewed on the director's monitor for review while on-location.

24 Claims, 3 Drawing Sheets

ON-LOCATION VIDEO ASSISTANCE SYSTEM WITH COMPUTER GENERATED IMAGERY OVERLAY

FIELD OF THE INVENTION

The present invention pertains to the field of film and video production. More particularly, the present invention pertains to on-location film and video production equipment.

BACKGROUND OF THE INVENTION

Computer graphics is used in a wide variety of applications, such as in business, science, animation, simulation, computer-aided design, process control, electronic publishing, gaming, medical diagnosis, etc. In an effort to portray a more realistic real-world representation, three dimensional objects are transformed into models having the illusion of depth for display onto a two-dimensional computer screen. This is accomplished by using a number of polygons to represent a three-dimensional object. Next, a scan conversion process is used to determine which pixels of a computer display fall within each of the specified polygons. Thereupon, texture is selectively applied to those pixels residing within specified polygons. Finally, lighting, shading, shadowing, translucency, and blending effects are applied.

As throughput of computer graphics systems has increased considerably in recent years, the realism of computer generated three-dimensional graphics has also improved. Computer generated scenes resembling reality and composed of millions of polygons are no longer uncommon. Many movies now contain computer rendered images and special effects. Some movies even include scenes that are completely computer generated. In those scenes, only the actors are real.

In creating scenes that include both real actors and computer generated imagery (CGI), the actors have to imagine or pretend that they are actually seeing the CGI. Thereafter, during post-production, computer images are created by animators and added onto the film footage. While the computer generated images and the actors may sometimes fit seamlessly together, the results are oftentimes unconvincing. For instance, two actors supposingly staring at the same computer generated "monster" may be looking in slightly different directions. Problems may also arise when actors move around and become blocked by the CGI. In this case, the footage may have to be re-shot. Otherwise, significant amount of post-production work, including cutting and pasting of the film footage, must be done. Re-shooting of a scene and extended post-production work are time consuming and are extremely expensive, and may cause significant delays in the production of a film.

Therefore, what is needed is a system for assisting the on-location production of movies, videos and films. What is further needed is a system and method for assisting the film production crew on-location such that post-production costs can be minimized. What is yet further needed is a system and method for assisting the film production crew such that re-shooting of flawed footage can be minimized.

SUMMARY OF THE DISCLOSURE

Accordingly, the present invention provides a video playback system for assisting on-location film production. One embodiment of the present invention includes a computer system capable of generating computer generated imagery (CGI) and receiving live video feed from a camera. The computer system is also coupled to a first display screen for rendering computer generated imagery and a second display screen for rendering the live video feed overlaid with computer generated imagery.

In the present embodiment, a portion of the first display screen containing computer generated imagery can be selected for overlaying on the live video feed. The video playback system of the present embodiment is also capable of storing the live video feed and the images resulted from overlaying the computer generated imagery and the live video feed. In this way, the present invention provides the advantages of allowing live/CGI (computer generated imagery) composites to be played and viewed in real-time on the director's monitor for review while on location. The video playback system of the present embodiment may also include audio inputs for receiving a live audio feed and storage for recording the audio synchronously with the live video feed. The video playback system of the present embodiment may also include a hand-held control unit for receiving control signals from a user.

Embodiments of the present invention include the above and further include a computer readable memory (e.g., a diskette or CD-ROM) containing therein computer readable codes for causing a computer system to perform a method comprising the steps of: generating computer generated imagery; rendering the computer generated imagery on a first display screen; receiving a live video stream; overlaying a user-selected portion of the first display screen on the live video stream to generate an overlaid video stream; and, rendering the overlaid video stream on a second display screen.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description, for purposes of explanation, numerous specific details are set forth in order to provide a thorough understanding of the present invention. It will be obvious, however, to one skilled in the art, upon reading this disclosure, that the present invention may be practiced without these specific details. In other instances, well-known structures and devices are not described in detail in order to avoid obscuring aspects of the present invention.

Unless specifically stated otherwise as apparent from the following discussions, it is appreciated that throughout the present invention, discussions utilizing terms such as "receiving", "determining", "generating", "associating", "assigning" or the like, refer to the actions and processes of a computer system, or similar electronic computing device. The computer system or similar electronic device manipulates and transforms data represented as physical (electronic) quantities within the computer system's registers and memories into other data similarly represented as physical quantities within the computer system memories into other data similarly represented as physical quantities within the computer system memories or registers or other such information storage, transmission, or display devices.

COMPUTER SYSTEM ENVIRONMENT OF THE PRESENT INVENTION

Figure 1:
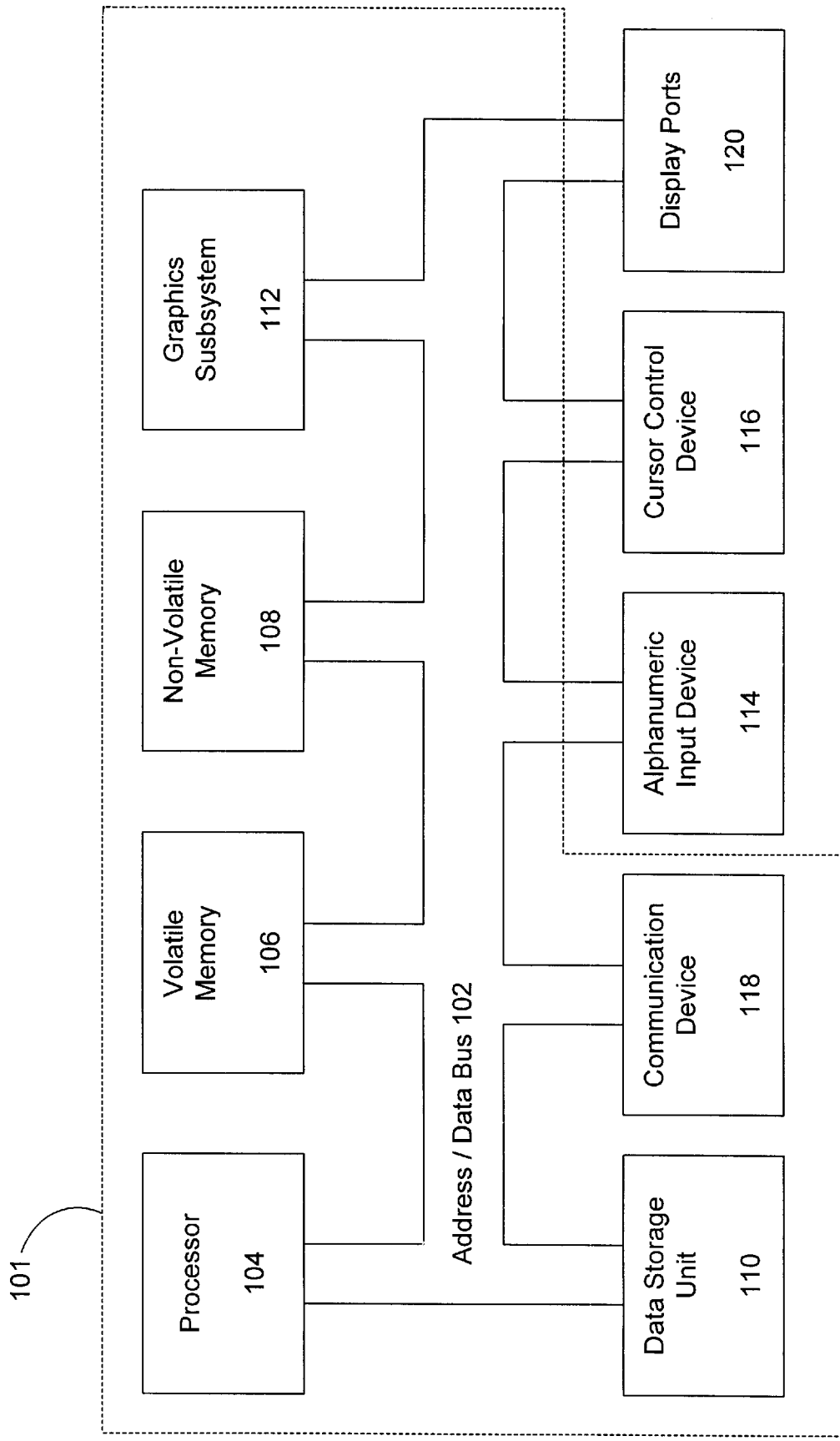
FIG. 1 is a block diagram illustrating an exemplary computer system used as part of a computer graphics system in accordance with one embodiment of the present invention.

With reference to FIG. 1, portions of the present invention are comprised of computer-readable and computer executable instructions which reside, for example, in computer-usable media of a computer system. FIG. 1 illustrates an exemplary computer system 101 used as a part of a computer graphics system in accordance with one embodiment of the present invention. It is appreciated that system 101 of FIG. 1 is exemplary only and that the present invention can operate within a number of different computer systems including general purpose computer systems, embedded computer systems, and stand alone computer systems specially adapted for generating 3-D graphics. An example of computer system 101 is the O$_2$® computer manufactured by SGI, Inc., of Mountain View, Calif., which is an assignee of the present invention.

Computer system 101 includes an address/data bus 102 for communicating information, a central processor 104 coupled with bus 102 for processing information and instructions, a volatile memory 106 (e.g., random access memory RAM) coupled with the bus 102 for storing information and instructions for the central processor 104 and a non-volatile memory 108 (e.g., read only memory ROM) coupled with the bus 102 for storing static information and instructions for the processor 104. Computer system 101 also includes a data storage device 110 ("disk subsystem") such as a magnetic or optical disk and disk drive coupled with the bus 102 for storing information and instructions. Data storage device 110 can include one or more removable magnetic or optical storage media (e.g., diskettes, tapes) which are computer readable memories. Memory units of system 101 include 106, 108 and 110. Computer system 101 can also include a graphics subsystem 112 (e.g., graphics adapter) coupled to the bus 102 for providing additional graphics processing power.

Computer system 101 can further include a communication device 118 (e.g., a radio frequency RF signal receiver) coupled to the bus 102 for interfacing with a signal source (e.g., an RF transmitter). Also included in computer system 101 of FIG. 1 is an optional input device 114 including alphanumeric and/or function keys coupled to the bus 102 for communicating information and command selections to the central processor 104. Computer system 101 also includes an optional cursor control or directing device 116 coupled to the bus 102 for communicating user input information and command selections to the central processor 104.

Display ports 120 are coupled to the bus 102 for providing display information to multiple displays. Optional cursor control device 116 allows the computer user to dynamically signal the two dimensional movement of a visible symbol (cursor) on a display screen of display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to receiving inputs by other means such as, for example, voice commands.

ON-LOCATION VIDEO ASSIST SYSTEM ACCORDING TO AN EMBODIMENT OF THE PRESENT INVENTION

Figure 2:
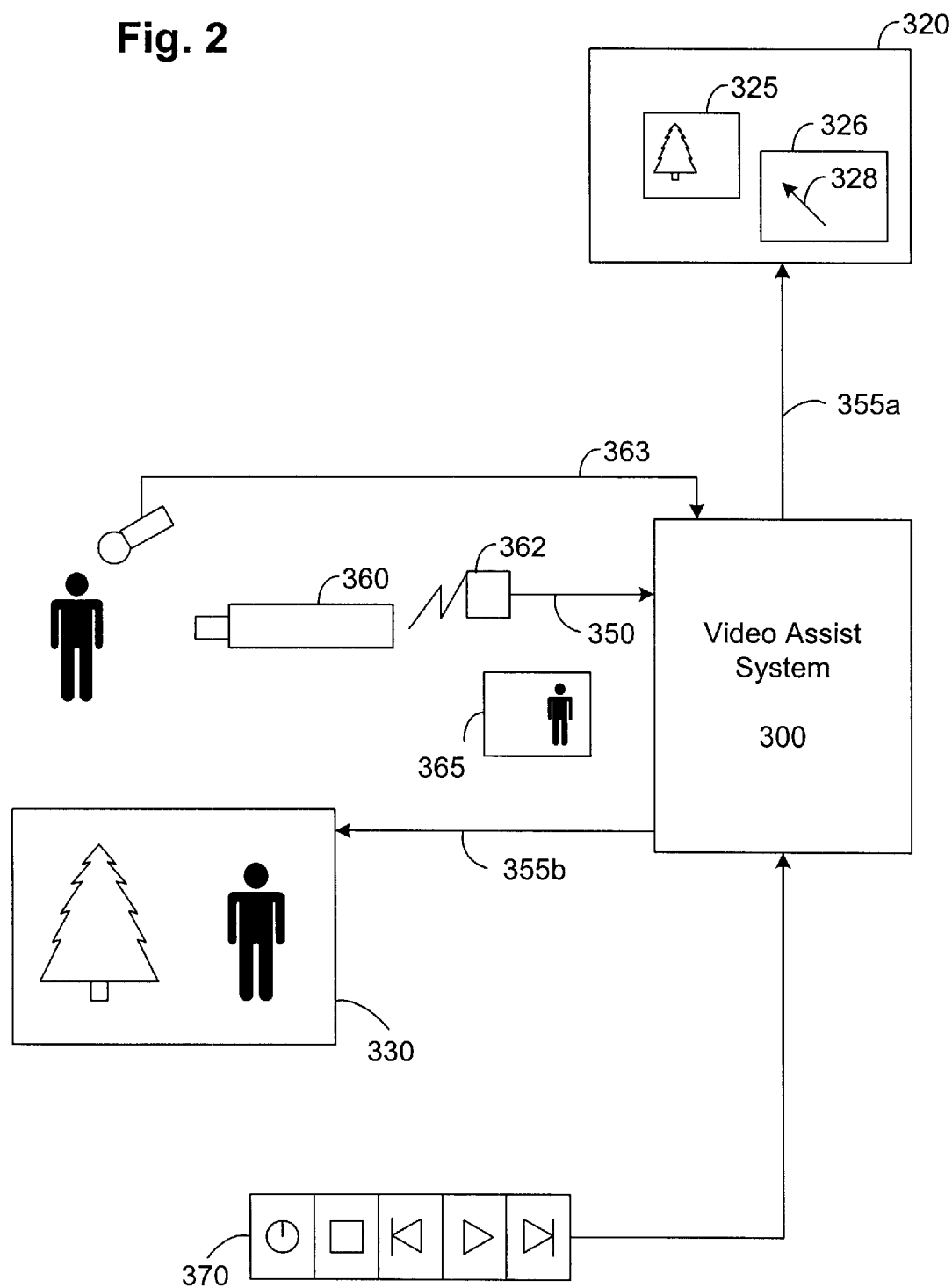
FIG. 2 is a block diagram illustrating an on-location video assist system with three-dimensional graphics overlay in accordance with an embodiment of the present invention.

FIG. 2 is a block diagram illustrating an on-location video assist system 300 in accordance with an embodiment of the present invention. As illustrated, video assist system 300 may be implemented with a computer system (e.g., system 101) having two video output ports 355a and 355b (e.g., video output ports 120) and a video signal input port 350 (e.g., communication device 118). In the present embodiment, video signal input port 350 is for receiving NTSC, Composite or SVHS signals transmitted from a camera 360. Also illustrated in FIG. 2 is a radio-frequency (RF) receiver 362 coupled to the input port 350 for receiving RF signals representative of video signals from the camera 360.

The first video output port 355a of the present embodiment is for coupling to a display known as an animator's monitor 320. According to the present embodiment, a user can create computer generated imagery (CGI) using animation software programs running on the computer system 101. Software programs for creating CGI and animation are well known in the art, and are not described here in detail to avoid obscuring aspects of the invention. In accordance with the present embodiment, CGI generated by animation software programs can be captured as a "snapshot" 325. That is, a user of the present invention can capture a portion of the screen on the animator's monitor 320 (or, any portion of the frame buffer of system 300) and store the captured portion as a image file which will be used as a texture map. An advantage of this feature of the present invention is that virtually any image that can be displayed on the animator's monitor 320, including images generated by any animation software, can be captured as a "snapshot" and subsequently overlaid on top of the live camera feed.

According to an embodiment of the present invention, an advantage of treating the CGI as a texture map is that many graphic manipulation techniques and transformations (e.g., rotating, sizing, blending, etc.) can be applied easily. In particular, the computer system 101 which includes special memory architecuture and devices that facilitate such processes, such as the SGI O$_2$ computer, may be used.

In furtherance of the present embodiment, a user may move the "snapshot" 325 to any position on a second display 330 by moving a cursor 328 on an area known as an "area of interest," or AOI 326, on the screen of the animator's monitor 320. Importantly, in the present embodiment, the user may move the cursor 328 around on the AOI 326 by using cursor control device (e.g., a mouse) or alphanumeric input device (e.g., a keyboard) coupled to video assist system 300, and the "snapshot" 325 would be automatically moved to a corresponding position on the second display 330. In addition, in the present embodiment, the cursor control device or the alpahnumeric input device can also be used for applying transformation (e.g., rotating, blending, sizing, etc) on the "snapshot" 325.

Via the input port 350, the video assist system 300 of the present embodiment receives signals 365 representative of a live camera tap from camera 360. The video assist system 300 then overlays the "snapshot" 325 on top of the live camera tap 365, and displays the live/CGI composite images on the second display 330 that is coupled to a second video output port 355b of the video assist system 300. The second display 330 is typically a television and is also known as the "director's monitor". Significantly, the position of the "snapshot" within the frame of the live camera tap is controlled by the position of the cursor within the AOI 326 of the animator's monitor 320. In this way, the director may instruct the animator with respect to how the CGI should look, where the CGI should be, etc., on location.

Further, the animator may make adjustments to the CGI while on location. Using the cursor control device, an animator may rotate, blend, enlarge, or otherwise manipulate the CGI according to the direction of the director. In stark contrast to traditional film production methods where directors and other production crew members are not able to view the composite imagery of the film footage and CGI until post-production, the present invention significantly facilitates the post-production processes of animation and special effects.

It is important to note that capabilities of the video assist system 300 of the present embodiment are not limited to overlaying a still image over the live camera tap. Rather, embodiments of the present invention may be capable of overlaying Motion JPEG signals and real-time rendered three-dimensional objects generated by animation software programs running on the video assist system 300.

According to the present embodiment, a video cassette recorder (VCR) or other recording devices may be coupled to the output port 355b of system 300 for recording the live/CGI composite signals. This feature is particularly useful to an animator during post-production. The recorded information of the live/CGI tap would provide a blueprint as to how exactly the CGI and other images should be added to the actual footage.

Additionally, the video assist system 300 of the present embodiment is capable of replaying stored camera footage or stored composite imagery at various speeds. For example, the video assist system. 300 may be used to assist the shooting of a explosion scene. Video assist system 300 may be used to store the footage for slow-motion replay immediately afterwards. Replaying stored footage at various rates can be achieved by frame-holding techniques (e.g., holding on a frame for 1/5 second instead of 1/35 second) and frame-skipping techniques (e.g., display every other frame, etc.):

Video assist system 300 of the present embodiment may further include a hand-held control unit 370 for controlling the functionality (e.g., playback speed, fast forward, etc.) of the video assist system. The hand-held control unit 370 may include buttons such as "PLAY," "PAUSE," "FAST FORWARD," "SLOW MOTION," etc., and playback speed controls. Using the hand-held unit, directors and other film production crew members would be able to control the system 300 with ease. Video assist system 300 of the present embodiment may further include an audio signal input 363 for receiving live audio feed from a microphone 362 during filming. The audio feed may also be recorded synchronously with the camera feed. Further, in the present embodiment, the animator's monitor has a wide aspect ratio and a display resolution of 1600×1028 pixels. A wide aspect ratio display, such as the SGI 1600SW, is available from SGI, Inc., of Mountain View, Calif.

Figure 3:
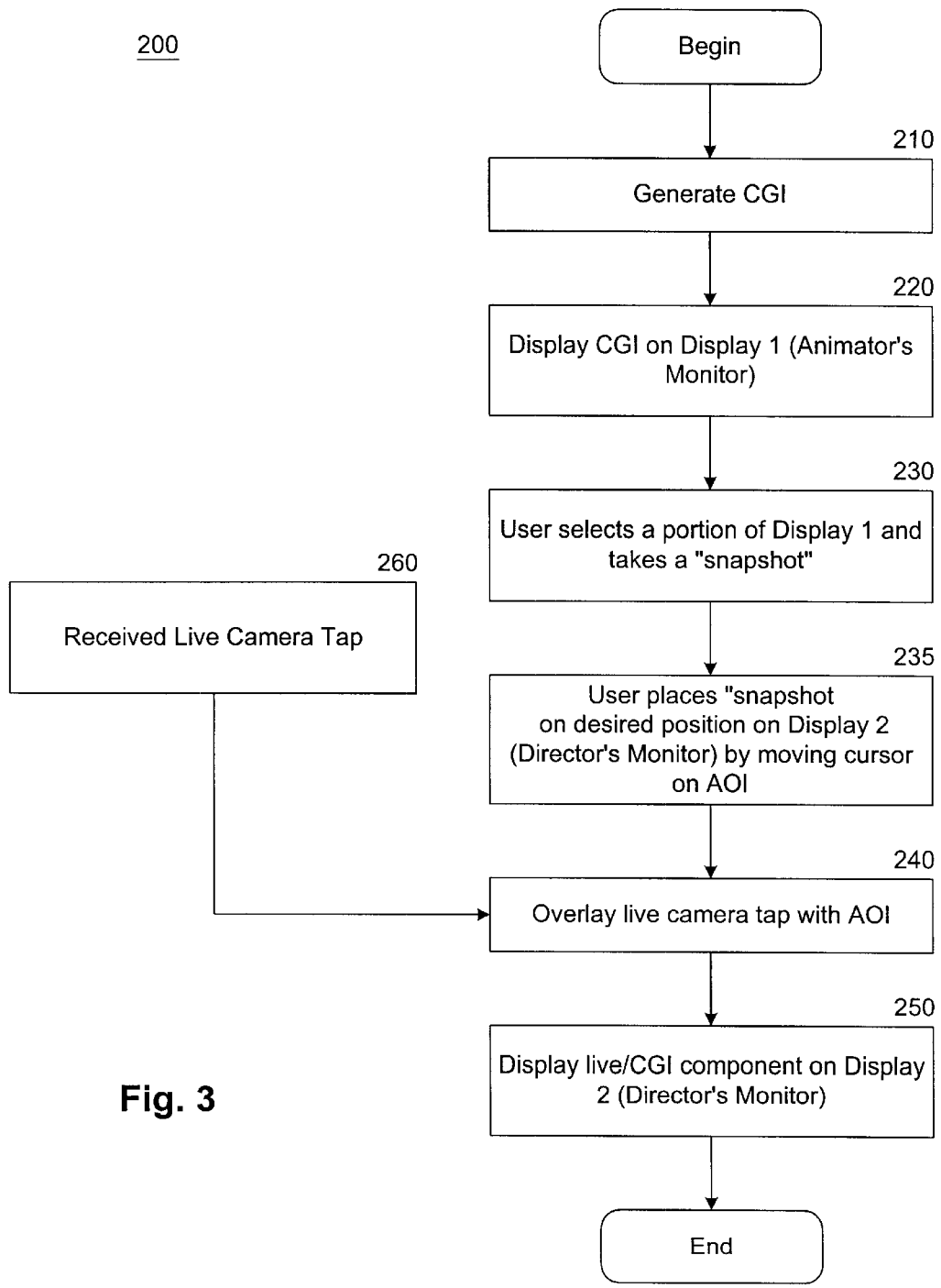
FIG. 3 is a flow diagram illustrating a process of film production using an on-location video assist system of FIG. 2 in accordance with an embodiment of the present invention.

FIG. 3 is a flow diagram illustrating a process of film production 200 using on-location video assist system 300 in accordance with an embodiment of the present invention. As illustrated, at step 210, CGI is generated by the on-location video assist system 300 using animation software programs. According to the present embodiment, CGI may be three-dimensional objects rendered in real-time by video assist system 300. In another embodiment, the CGI may be a sequence of pre-rendered images stored in storage devices of the video assist system 300 in a compressed or raw format.

At step 220, CGI is rendered on the animator's display 320. In the present embodiment, the CGI is rendered on the animator's display 320 such that the animator may perform adjustment to the CGI such as rotating, lighting, color, sizing etc.

At step 230, the animator takes a "snapshot" 325 of the CGI rendered on the animator's display 320. According to the present embodiment, the animator selects an area of the screen of the animator's monitor that includes the CGI, and the selected area is automatically captured as the "snapshot" 325. Preferrably, the "snapshot" 325 is treated as a texture map such that transformating, rotation and other processes may be performed on the "snapshot" 325 easily.

At step 235, the animator places the "snapshot" 325 on the director's monitor 330 by placing the cursor 328 on a corresponding location on the AOI 326. In the present embodiment, the AOI 326 has 640×480 pixels each having a one-to-one correspondence with the pixels of the director's monitor 330. In the present embodiment, by moving the cursor 328 on the AOI 326, the "snapshot" 325 will also move accordingly.

At step 260, the video assist system 300 receives live video feed 365 from a camera 260. In the present embodiment, the live video feed 365 is transmitted via RF to an RF-receiver 362 of the video assist system 300. In other embodiments, a cable may be used to transmit video signals from camera 360 to video assist system 300. Further, in the present embodiment, the video assist system 300 is capable of receiving video signals in formats such as SVHS, Composite, HDTV, etc.

At step 240, the video assist system 300 of the present embodiment overlays the live video feed 365 with the "snapshot" 325. According to the present embodiment, the "snapshot" 325 and the live video feed 365 are "blended" together to form a composite image. Image blending techniques are well known in the art, and are therefore not discussed here to avoid obscuring aspects of the present invention.

At step 250, after blending the live video feed 365 and the "snapshot" 325, the live/CGI composite video is displayed on the director's monitor 330 for the director's review. The live/CGI composite video is instrumental in the production of the movie or video and provides a tremendous amount of assistance to directors, actors, animators and other film production crew.

The present invention, a video assist system for on-location film and video production, has thus been disclosed. An advantage of the present invention is that, using the video assist system, animators and directors would be able to see how the special effects look together with the live actors during production. In addition, film production cost would also be decreased because any potential problems with overlaying the CGI onto the film footage can be spotted and fixed early in the production process. It should be appreciated that the present invention has been described with specific references. However, it should be appreciated that specific references within the present disclosure should not be construed to limit the scope of the present invention. Rather, the scope of the present invention should be construed according to the below claims.

What is claimed is:

1. A video playback system comprising:

means for generating computer generated imagery;

means for displaying said computer generated imagery on a first display screen;

means for selecting a portion of said first display screen, said portion including said computer generated imagery;

means for receiving a live video stream;

means for overlaying video signals representative of said portion of said first display screen on said live video stream to generate an overlaid video stream;

means for rendering said overlaid video stream on a second display screen; and means for storing said overlaid video stream.

2. A video playback system as recited in claim 1 further comprising means for recording a live audio stream.

3. A video playback system as recited in claim 1 wherein said means for receiving comprises a radio frequency (RF) receiver.

4. A video playback system as recited in claim 1 further comprising a hand-held controller unit for controlling the display of said overlaid video stream.

5. A video playback system comprising:

means for generating computer generated imagery;

means for displaying said computer generated imagery on a first display screen;

means for selecting a portion of said first display screen, said portion including said computer generated imagery;

means for receiving a live video stream;

means for overlaying video signals representative of said portion of said first display screen on said live video stream to generate an overlaid video stream;

means for rendering said overlaid video stream on a second display screen; and means for replaying said live video stream at a different speed than a speed at which said live video stream is filmed.

6. A video playback system as recited in claim 5 further comprising means for recording a live audio stream.

7. A video playback system as recited in claim 5 wherein said means for receiving comprises a radio frequency (RF) receiver.

8. A video playback system as recited in claim 5 further comprising a hand-held controller unit for controlling the display of said overlaid video stream.

9. A computer readable memory having stored therein computer readable program code for causing a computer system to perform a method of displaying a live video feed, said method comprising the steps of:

generating computer generated imagery;

displaying said computer generated imagery on a first display screen;

selecting a portion of said first display screen, said portion including said computer generated imagery;

receiving a live video stream;

overlaying video signals representative of said portion of said first display screen on said live video stream to generate an overlaid video stream;

rendering said overlaid video stream on a second display screen; and storing said overlaid video stream.

10. A computer readable memory as recited in claim 9 wherein said method further comprises the step of recording a live audio stream.

11. A computer readable memory as recited in claim 9 wherein said method further comprises the step of converting a radio frequency (RF) signal representing said live video stream into digital representation for said live video stream.

12. A computer readable memory as recited in claim 9 wherein said method further comprises the step of receiving control signals from a hand-held controller unit.

13. A computer readable memory having stored therein computer readable program code for causing a computer system to perform a method of displaying a live video feed, said method comprising the steps of:

generating computer generated imagery;

displaying said computer generated imagery on a first display screen;

selecting a portion of said first display screen, said portion including said computer generated imagery;

receiving a live video stream;

overlaying video signals representative of said portion of said first display screen on said live video stream to generate an overlaid video stream;

rendering said overlaid video stream on a second display screen; and replaying said live video stream at a different speed than a speed at which said live video stream is filmed.

14. A computer readable memory as recited in claim 13 wherein said method further comprises the step of recording a live audio stream.

15. A computer readable memory as recited in claim 13 wherein said method further comprises the step of converting a radio frequency (RF) signal representing said live video stream into digital representation for said live video stream.

16. A computer readable memory as recited in claim 13 wherein said method further comprises the step of receiving control signals from a hand-held controller unit.

17. A method of displaying a live video feed, said method comprising the steps of:

generating computer generated imagery;

displaying said computer generated imagery on a first display screen;

selecting a portion of said first display screen, said portion including said computer generated imagery;

receiving a live video stream;

overlaying video signals representative of said portion of said first display screen on said live video stream to generate an overlaid video stream;

rendering said overlaid video stream on a second display screen; and storing said overlaid video stream.

18. A method as recited in claim 17 wherein said method further comprises the step of recording a live audio stream.

19. A method as recited in claim 17 wherein said method further comprises the step of converting a radio frequency (RF) signal representing said live video stream into digital representation for said live video stream.

20. A method as recited in claim 17 wherein said method further comprises the step of receiving control signals from a hand-held controller unit.

21. A method of displaying a live video feed, said method comprising the steps of:

generating computer generated imagery;

displaying said computer generated imagery on a first display screen;

selecting a portion of said first display screen, said portion including said computer generated imagery;

receiving a live video stream;

overlaying video signals representative of said portion of said first display screen on said live video stream to generate an overlaid video stream;

rendering said overlaid video stream on a second display screen; and replaying said live video stream at a slower speed than a speed at which said live video stream is filmed.

22. A method as recited in claim 21 wherein said method further comprises the step of recording a live audio stream.

23. A method as recited in claim 21 wherein said method further comprises the step of converting a radio frequency (RF) signal representing said live video stream into digital representation for said live video stream.

24. A method as recited in claim 21 wherein said method further comprises the step of receiving control signals from a hand-held controller unit.

* * * * *